US012466089B2

(12) United States Patent
Reichert

(10) Patent No.: US 12,466,089 B2
(45) Date of Patent: Nov. 11, 2025

(54) KNIFE WITH DOUBLE FOLDING BLADES

(71) Applicant: Abraham Reichert, Modiin (IL)

(72) Inventor: Abraham Reichert, Modiin (IL)

( * ) Notice: Subject to any disclaimer, the term of this patent is extended or adjusted under 35 U.S.C. 154(b) by 247 days.

(21) Appl. No.: 18/534,931

(22) Filed: Dec. 11, 2023

(65) Prior Publication Data

US 2024/0208086 A1 Jun. 27, 2024

Related U.S. Application Data

(60) Provisional application No. 63/476,695, filed on Dec. 22, 2022.

(51) Int. Cl.
*B26B 1/04* (2006.01)

(52) U.S. Cl.
CPC .................................... *B26B 1/04* (2013.01)

(58) Field of Classification Search
CPC ...................................................... B26B 1/04
See application file for complete search history.

(56) References Cited

U.S. PATENT DOCUMENTS

| | | | | | |
|---|---|---|---|---|---|
| 1,393,700 | A * | 10/1921 | Reboul | B26B 21/00 30/47 |
| 2,159,798 | A * | 5/1939 | Hyatt | B26B 1/04 30/160 |
| 3,600,729 | A * | 8/1971 | Laughlin | B26B 11/00 7/165 |
| 3,825,961 | A * | 7/1974 | Klein | A01K 95/02 30/28 |
| 5,255,438 | A * | 10/1993 | Morgan | B26B 13/22 30/244 |
| 10,688,672 | B1 * | 6/2020 | Perez | B26B 1/10 |
| 2024/0208086 | A1 * | 6/2024 | Reichert | B26B 1/04 |

* cited by examiner

*Primary Examiner* — Sean M Michalski
(74) *Attorney, Agent, or Firm* — Dekel Patent Ltd.; David Klein

(57) ABSTRACT

A knife includes a handle, a first blade member which is foldable about a first pivot located near or on the handle, and a second blade member foldable about a second pivot located in the first blade member.

8 Claims, 8 Drawing Sheets

KNIFE WITH DOUBLE FOLDING BLADES

FIELD OF THE INVENTION

The present invention relates to cutting instruments and more specifically to a knife with double folding blades, and may include locking mechanisms.

BACKGROUND OF THE INVENTION

Cutting instruments have been used for centuries by craftsmen, hunters, and others requiring a sharp cutting and/or sawing instrument. Besides fixed length knives, folding knives which generally have two positions are well known. The cutting edge of the blade is stored within a cavity or slot in the handle portion of the knife. The blade can be folded about a pivot out of this cavity and locked in placed for use as a cutting knife. The total length of the blade is thus always shorter than the handle length (the ratio between the lengths of the blade and the handle is around 0.8-1). This limits the blade size to be approximately the size of a normal human hand width. This is in contrast with unfolded knifes, which have a blade which is much larger than the handle.

It is noted that throughout the specification and claims the term "knife" encompasses any cutting instrument, including knives, saws, scalpels, surgical cutting tools and more.

SUMMARY

The present invention seeks to provide knife with double folding blades that achieves a larger ratio than the prior art between the blade and the handle by adding a further folding stage of the blade so that the unfolded blade can be larger than the handle and attain a length ratio up to 2:1 between the blade and the handle.

There is provided in accordance with a non-limiting embodiment of the invention, a knife including a handle, a first blade member which is foldable about a first pivot located near or on the handle, and a second blade member foldable about a second pivot located in the first blade member.

BRIEF DESCRIPTION OF DRAWINGS

The present invention will be understood and appreciated more fully from the following detailed description, taken in conjunction with the drawings in which.

DETAILED DESCRIPTION

Figure 1:
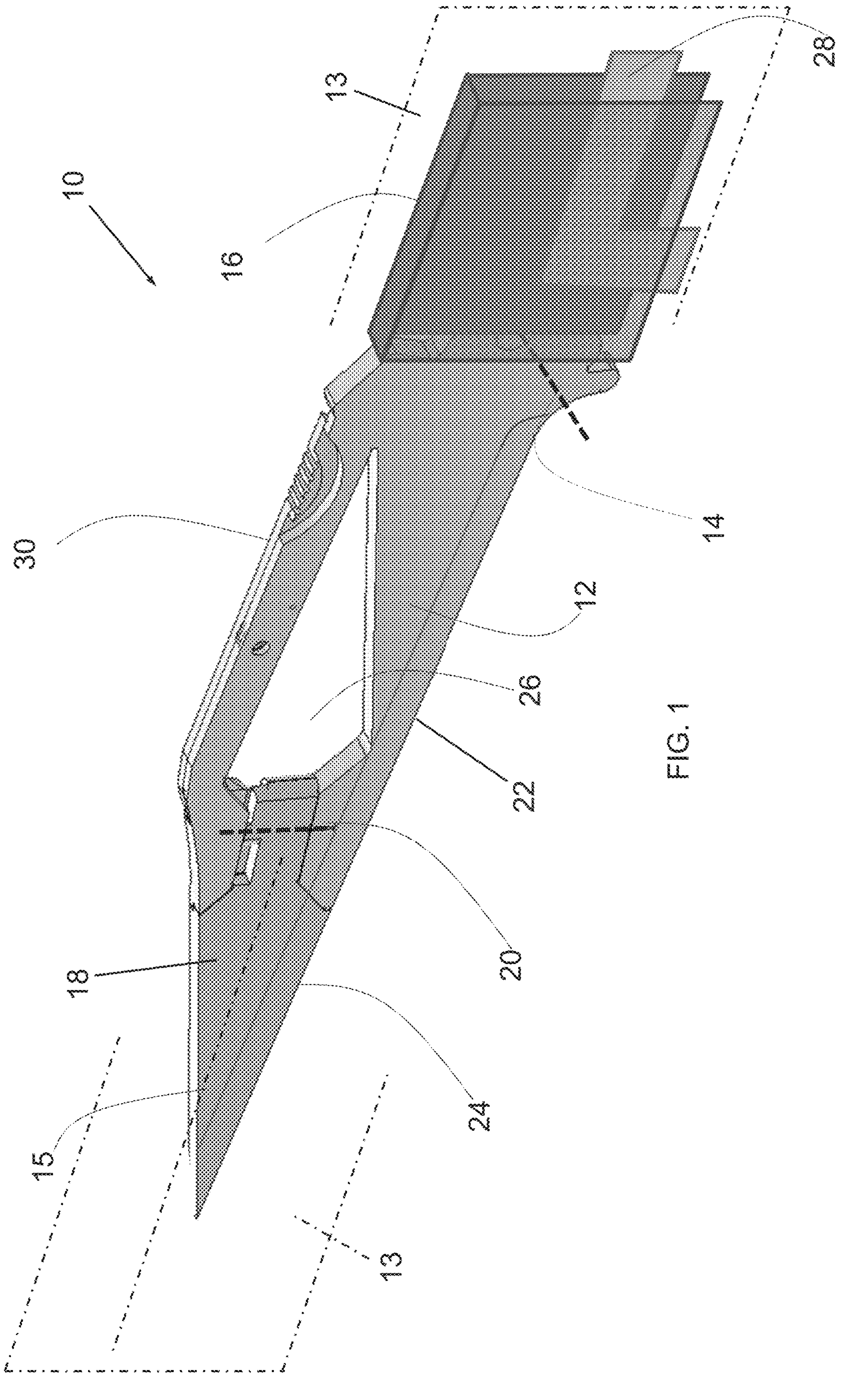
FIG. 1 is a simplified illustration of a knife, in accordance with a non-limiting embodiment of the present invention, showing the knife in a fully open (fully unfolded) orientation in which a first blade member is pivoted about a first pivot located near or on the handle, and a second blade member is pivoted about a second pivot located in the first blade member.

Reference is now made to FIG. 1, which illustrates a knife 10, in accordance with a non-limiting embodiment of the present invention.

Knife 10 includes a first blade member 12 which is foldable about a first pivot 14 located near or on a handle 16. A second blade member 18 is foldable about a second pivot 20 located in the first blade member 12.

In one embodiment, the first pivot 14 is perpendicular to the second pivot 20. In one embodiment, the first pivot 14 is perpendicular to a longitudinal plane 13 of knife 10, whereas the second pivot 20 lies in the longitudinal plane 13 of knife 10. The second pivot 20 may be perpendicular to the longitudinal axis 15 of the knife 10.

The first blade member 12 has a first knife edge 22 and the second blade member 18 has a second knife edge 24. In one embodiment, when the knife is in the fully open (fully unfolded) orientation of FIG. 1, first knife edge 22 and second knife edge 24 form one continuous collinear knife edge.

In one embodiment, the first blade member 12 is formed with a cutout 26 into which the second blade member 18 can be received when pivoted about second pivot 20.

In one embodiment, the first blade member 12 and the second blade member 18 may include first and second locking mechanisms 28 and 30, respectively.

Figure 2:
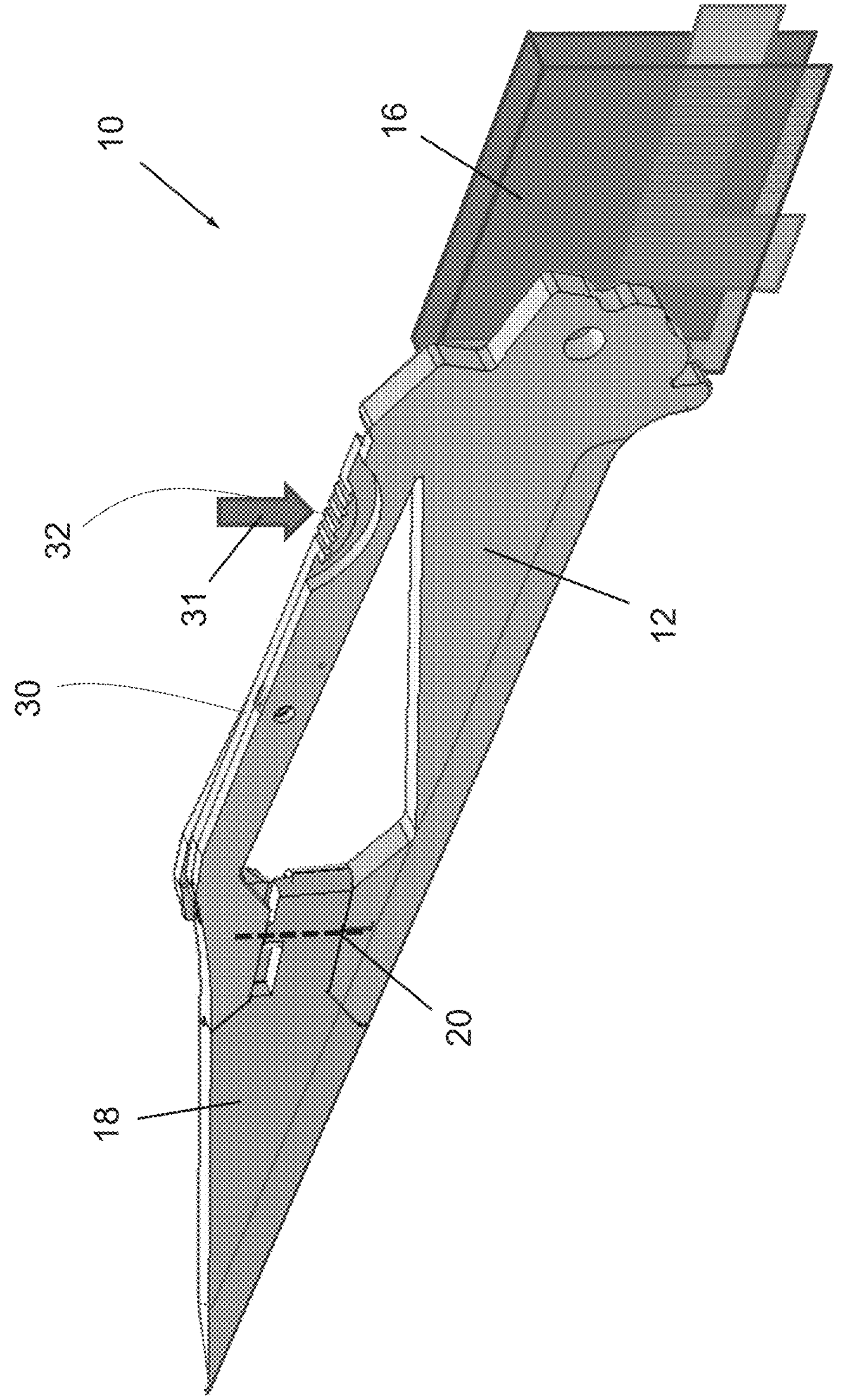
FIG. 2 is another view of the second blade member pivoted about the second pivot.

FIG. 2 is another view of the second blade member 18 pivoted about the second pivot 20. By depressing a lever 32 of second locking mechanism 30 in the direction of arrow 31, the second locking mechanism 30 is released and second blade member 18 can be folded about the second pivot 20

Figure 2A:
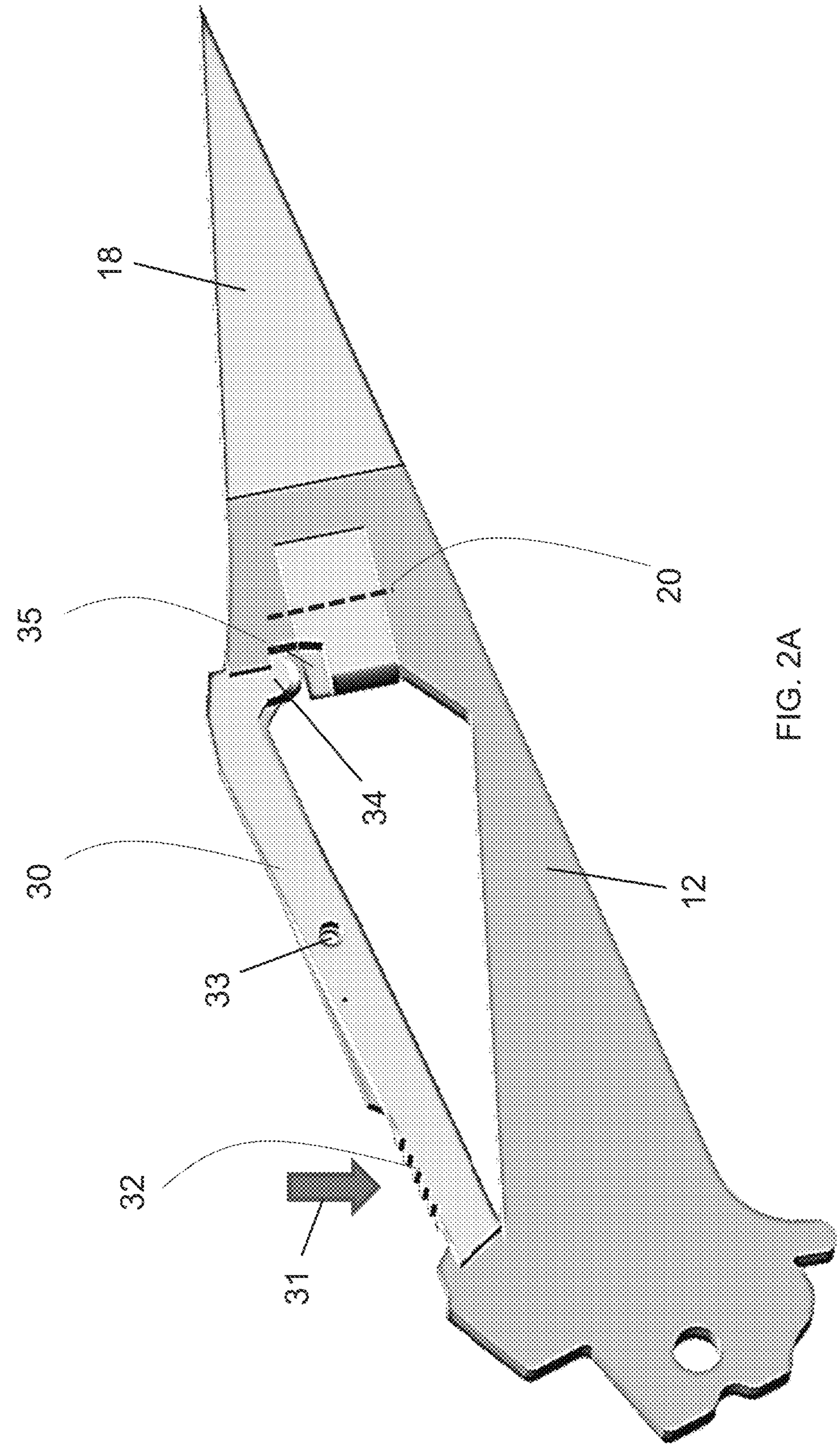
FIG. 2A is yet another view of the second blade member.

FIG. 2A is yet another view of the second blade member 18. It is seen that the lever 32 of second locking mechanism 30 pivots about a pivot 33 and includes a lug 34 that is received in a groove 35 formed in a portion of first blade member 12 near second pivot 20. When lug 34 is received in groove 35, lug 34 prevents second blade member 18 from being pivotable about second pivot 20 and thus locks second blade member 20 in its extended position. By depressing second locking mechanism 30 in the direction of arrow 31 about pivot 33, lug 34 moves out of groove 35 and second blade member 18 can now be pivoted about second pivot 20.

Figure 2B:
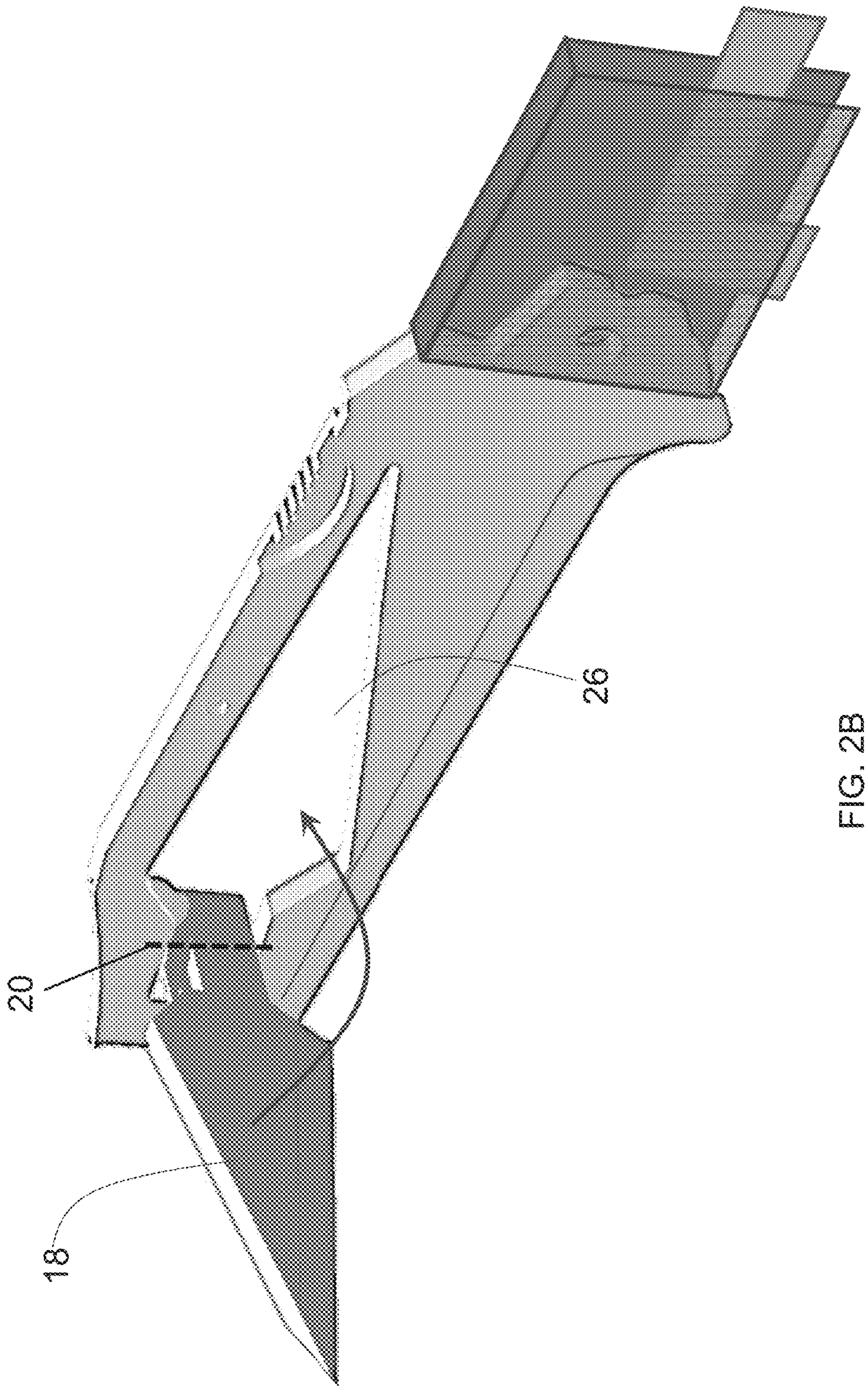
FIG. 2B illustrates an intermediate stage of folding the second blade member.

FIG. 2B illustrates an intermediate stage of folding the second blade member 18.

Figure 3:
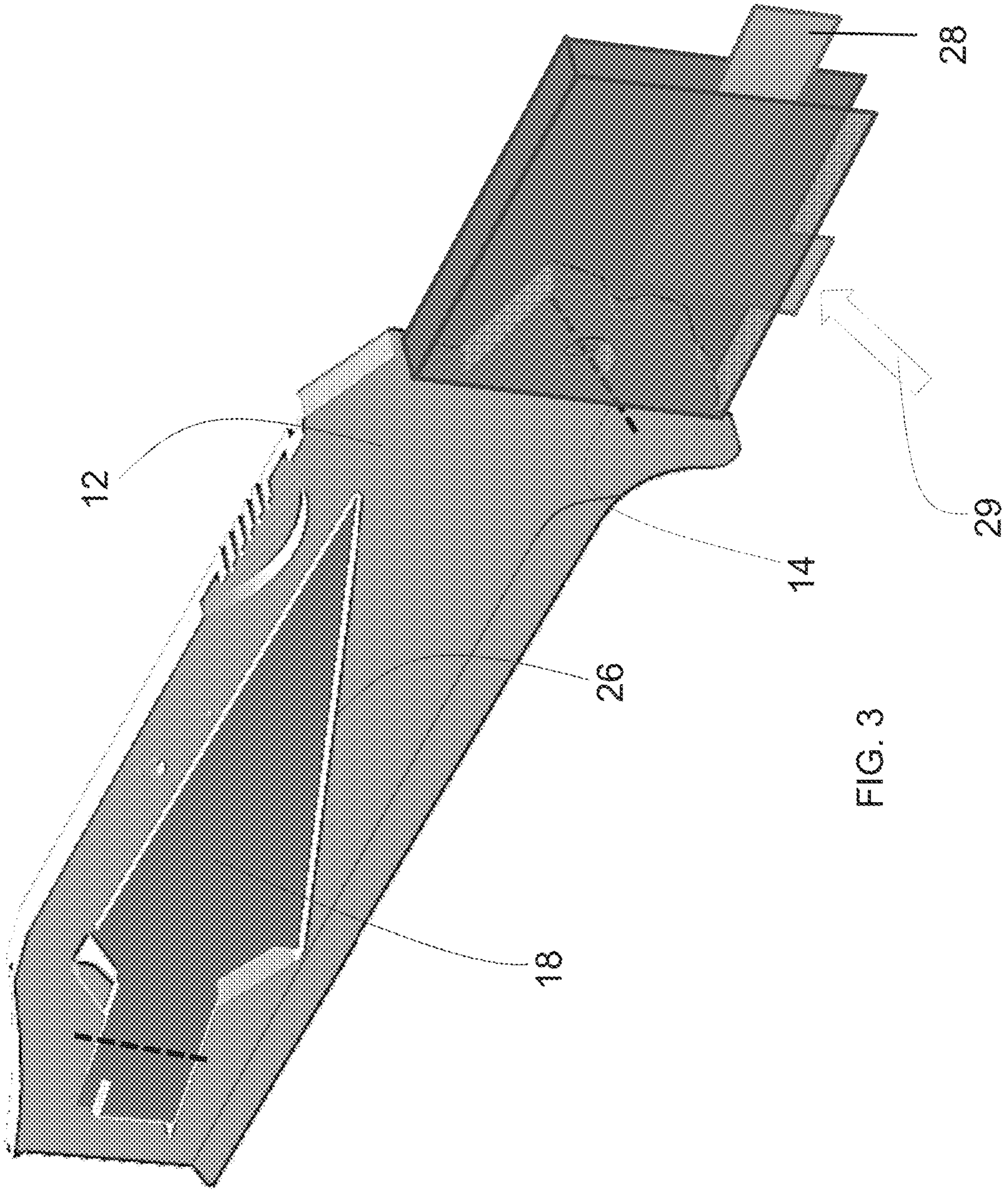
FIG. 3 illustrates the second blade member in its closed (folded) position.

FIG. 3 illustrates the second blade member 18 in its closed (folded) position. By depressing first locking mechanism 28 in the direction of arrow 29, the first blade member 12 can now be pivoted about first pivot 14.

Figure 4:
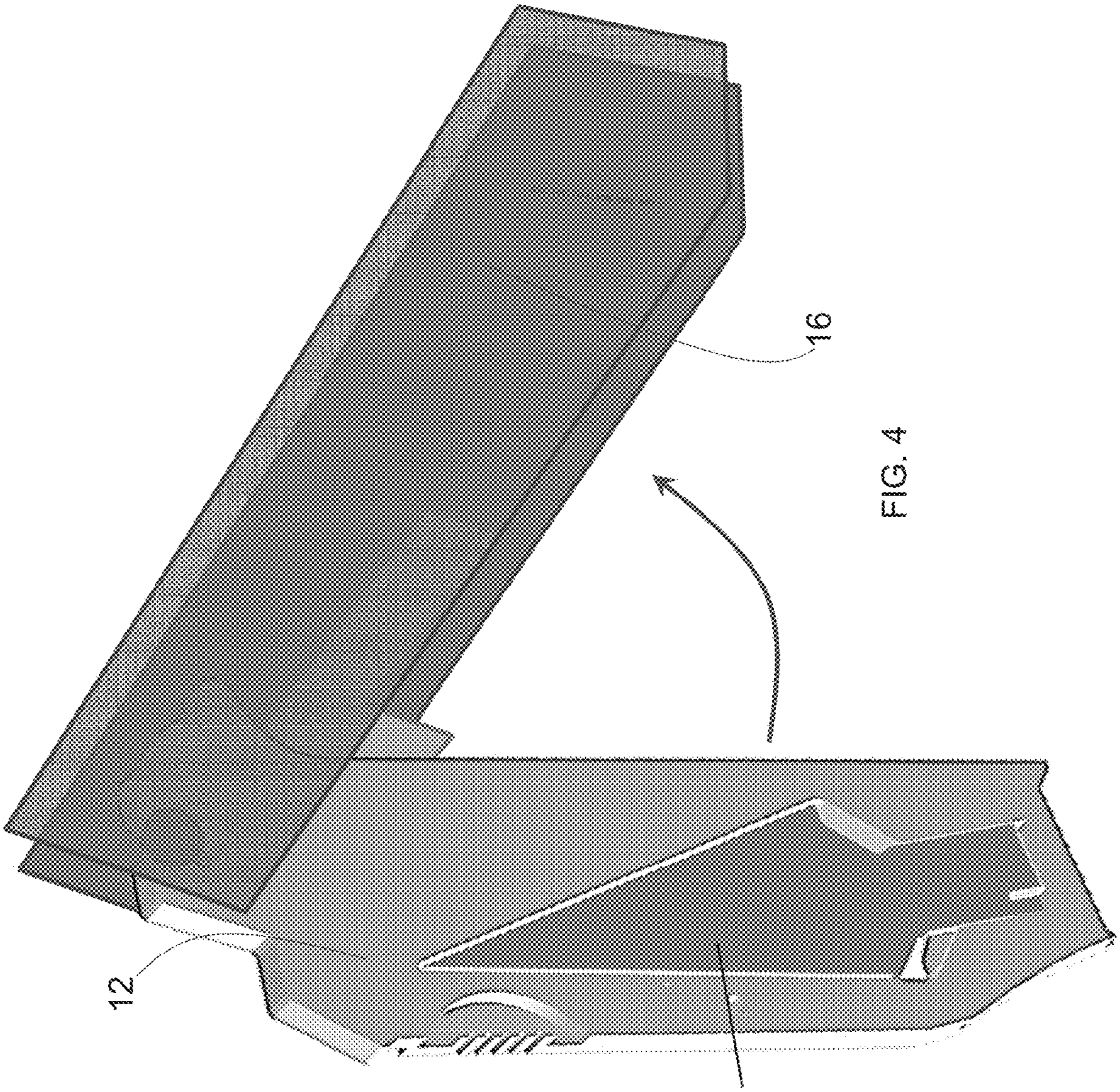
FIG. 4 illustrates an intermediate stage of pivoting the first blade member, with the second blade member already pivoted to the plane of the first blade member, towards the handle.

FIG. 4 illustrates an intermediate stage of pivoting the first blade member 12, with the second blade member 18 already folded to the plane of the first blade member 12, towards the handle 16.

Figure 4A:
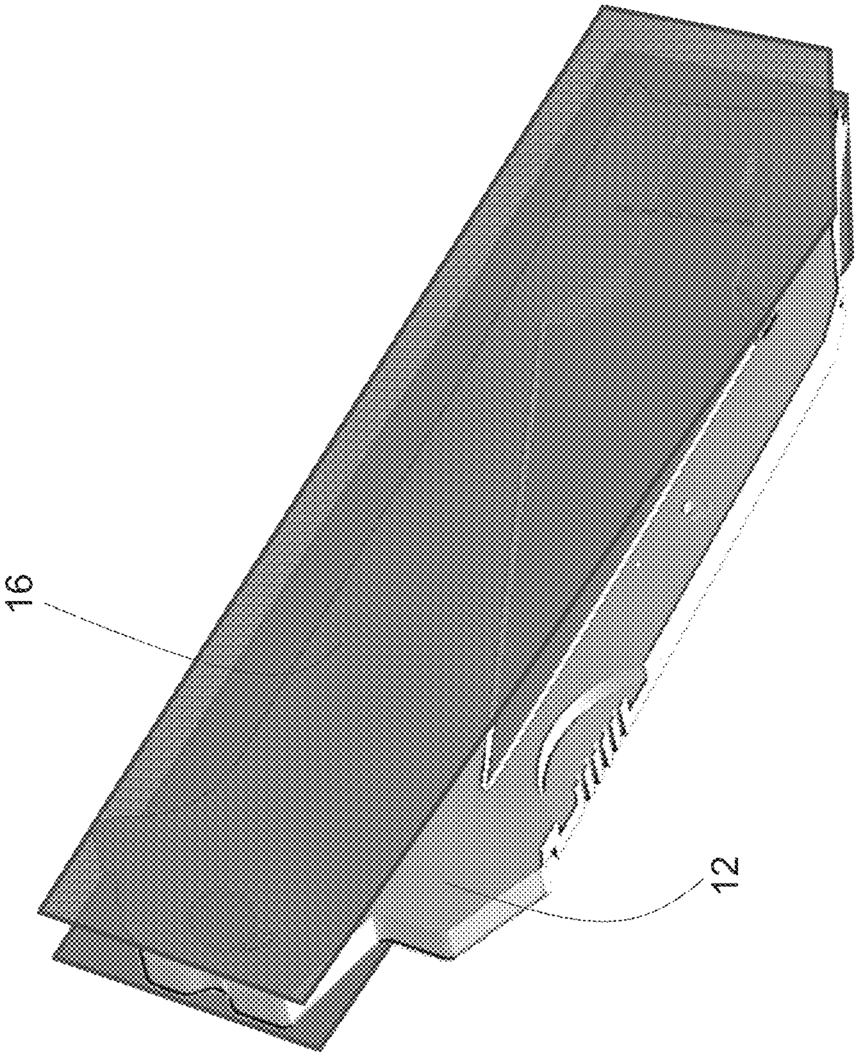
FIG. 4A illustrates the first blade member in its closed (folded) position.

FIG. 4A illustrates the first blade member 12 in its closed (unfolded) position.

Figure 5:
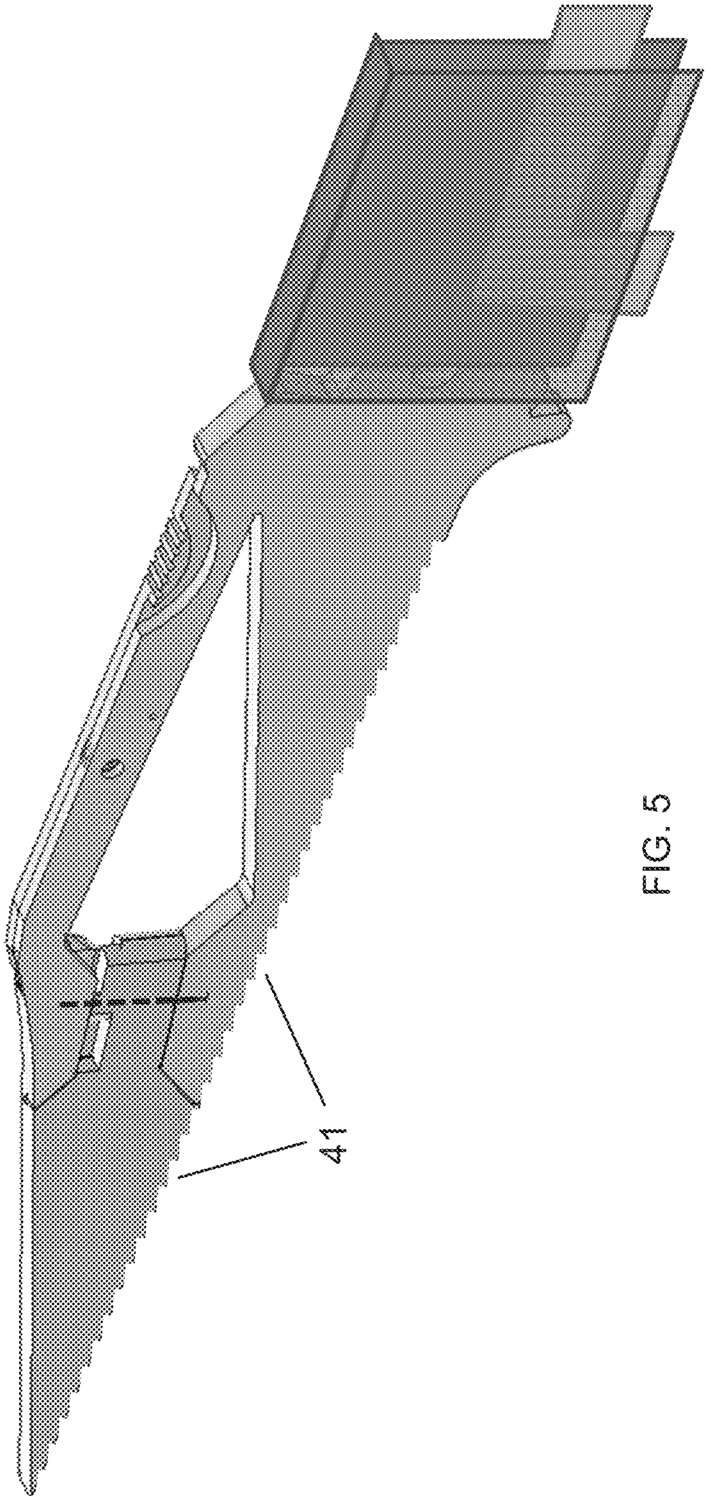
FIG. 5 is a simplified illustration of the knife, in accordance with another non-limiting embodiment of the present invention, in which the knife blades have saw teeth.

FIG. 5 is a simplified illustration of the knife, in accordance with another non-limiting embodiment of the present invention, in which the knife blades have saw teeth 41.

It is noted that in all embodiments above, the total thickness of the knife blade is the same in the open (fully unfolded) and closed (folded) orientations.

The invention claimed is:

1. A knife comprising:

a handle;

a first blade member which is foldable about a first pivot located near or on said handle; and a second blade member foldable about a second pivot located in said first blade member.

2. The knife according to claim 1, wherein said first pivot is perpendicular to said second pivot.

3. The knife according to claim 1, wherein said first pivot is perpendicular to a longitudinal plane of said knife, and said second pivot lies in the longitudinal plane of said knife.

4. The knife according to claim 1, wherein said second pivot is perpendicular to a longitudinal axis of said knife.

5. The knife according to claim 1, wherein said first blade member has a first knife edge and said second blade member has a second knife edge, and when said knife is in a fully open orientation, said first knife edge and said second knife edge one continuous collinear knife edge.

6. The knife according to claim 1, wherein said first blade member is formed with a cutout into which said second blade member is receivable when pivoted about said second pivot.

7. The knife according to claim 1, wherein said first blade member and said second blade member comprise first and second locking mechanisms, respectively.

8. The knife according to claim 1, wherein a total thickness of said first and second blade members remains unchanged in both fully unfolded and fully folded orientations.

* * * * *